July 22, 1969  D. G. RADKE ET AL  3,456,981
BUCKLE MECHANISM WITH ENERGY ABSORBING LINK
Filed Aug. 8, 1967

INVENTOR.
DONALD G. RADKE
FREDERICK C. BOOTH
BY
Hawks, Knass & Gifford
ATTORNEYS.

3,456,981
BUCKLE MECHANISM WITH ENERGY ABSORBING LINK

Donald G. Radke, Troy, and Frederick C. Booth, Birmingham, Mich., assignors to Jim Robbins Seat Belt Co., Royal Oak, Mich.
Filed Aug. 8, 1967, Ser. No. 659,124
Int. Cl. B60r 21/10; A44b 17/00, 19/00
U.S. Cl. 297—389          16 Claims

ABSTRACT OF THE DISCLOSURE

A buckle mechanism for joining a pair of lap belts and a shoulder belt at a common intersection to form a body restraining system. A buckle carried by one of the lap belts is releasably joined to an engaging plate carried by the second lap belt. The edge of the engaging plate is formed into a tongue which is received by the buckle. A locking pin carried along a second side of the engaging plate is releasably attached to a coupling carried by the shoulder belt. A deformable element links the pin and the coupling so that when the shoulder belt applies a body restraining force the deformable link yields so that the restrained occupant experiences a cushioned deceleration when the vehicle is subjected to a sudden and violent deceleration.

BACKGROUND OF THE INVENTION

Field of the invention

This invention relates to buckle mechanisms for joining a pair of lap belt sections and a shoulder belt section of a vehicle seat belt assembly at a common intersection and more specifically to such a mechanism having a coupling with a yieldable link arranged to absorb the kinetic energy of a body restrained by the system.

Description of the prior art

Vehicle safety seat belt systems employing both shoulder and lap belt sections to provide a restraining force on a seated vehicle occupant when an occurrence produces a sudden or violent change in the forward momentum of the vehicle have received considerable interest as the result of federal legislation directed toward improving the safety features of automotive vehicles. One of the major problems associated with such multi-belt systems is to provide reliable and inexpensive means for releasably coupling the belt sections together to provide a restraining system while at the same time allowing the occupant to have a degree of selectivity in the form of the restraint. This is because there are circumstances under which the occupant may desire to have a lap restraint without an upper torso restraint. Because it is necessary to provide a separate seat belt system for each occupant of the vehicle, a suitable coupling must provide means for joining both the lap and shoulder belts in a single mechanism in order to keep the over-all number of buckle components in the vehicle to a minimum.

Another problem associated with the conventional seat belt systems is that when the occupant experiences inertial forces tending to suddenly and violently displace him from his seated position because of an occurrence producing an abrupt change in the forward momentum of the vehicle, conventional seat belts and their connections provide a nonyielding restraining force. This force acts on the occupant so that he maintains substantially his same relative position within the vehicle. The result is that his kinetic energy is suddenly and violently terminated with the energy being absorbed by his restrained torso, thereby, often producing serious internal injuries.

Various devices have been suggested in the prior art for absorbing the kinetic energy of the occupant in a gradual manner between the time the vehicle commences decelerating and the time the occupant has fully decelerated with his energy being absorbed in the system as by a yieldable connection between the seat belt and the vehicle, a stretchable belt and the like. Such energy absorbing systems have in general proven to be expensive, difficult to maintain in an operable condition, and frequently produce an injury-producing rebound effect on the occupant.

It is the broad purpose of the present invention to provide an improved coupling assembly for joining a pair of lap belt sections and a shoulder belt section at a common intersection while permitting the occupant to exercise a degree of selectivity in the form of restraint he desires and which provides an energy absorbing, yieldable connection between the belts to absorb the kinetic energy of the occupant without rebound.

SUMMARY

The preferred embodiment of the present invention, which will be subsequently described in greater detail, is described with reference to a safety seat belt system comprising a pair of lap belt sections having their lower ends anchored to the vehicle and extending upwardly from opposite lateral sides of the occupant and having their upper ends joined by a preferred coupling mechanism to the lower end of a shoulder belt which has its upper end anchored to an upper structural portion of the vehicle.

The preferred coupling assembly comprises a buckle having internal tongue locking structure carried by one of the lap belts. The opposite lap belt carries a flat engaging plate having an apertured tongue formed along one of its side edges and adapted to releasably engage the buckle to provide a closed lap belt system.

An upstanding locking pin carried adjacent a second side of the engaging plate is engageable in a pin-receiving aperture provided in a coupling plate carried by the shoulder belt section. A spring loaded retainer releasably engages the pin to maintain the coupling plate in overlapping engagement with the engaging plate.

A slot formed in the coupling plate extends away from the pin-receiving aperture in a direction opposite to the shoulder belt and receives the pin when the shoulder belt applies a restraining force on the occupant. This permits the coupling plate to move with respect to the engaging plate a distance corresponding to the length of the slot before a positive connection is formed between the shoulder belt section and the lap belt system. This movement occurs only when the belts develop a restraining force. Until this occurs, the belts are joined but readily disengageable.

A second form of the invention, similar to the preferred embodiment employs a deformable tear strip mounted on the coupling plate with an aperture engaged with the pin to provide a link between the two plates. When the shoulder belt develops a predetermined restraining force, the coupling plate and the engaging plate move away from one another as the pin is received in the slot. As the pin moves longitudinally in the slot, it tears the expendable element in such a manner that the kinetic energy of the occupant associated with the restraining force is absorbed.

It is therefore an object of the present invention to provide an improved coupling assembly for joining a pair of lap belt sections and a shoulder belt section at a common intersection while permitting the shoulder belt section to be attached independently of the connection between the lap belt sections.

It is another object of the present invention to provide means for absorbing the kinetic energy of a body restrained by a combined lap and shoulder belt system which takes the form of a deformable element forming a link in coupling means joining a pair of belt sections of the system.

Still another object of the present invention is to provide a novel form of coupling for joining three belt sections at a common intersection to form a body restraining system including a buckle carried by one of the belts and having tongue locking structure; an engaging plate carried by a second belt section and having a tongue formed along one edge, the tongue being engageable with the buckle to provide an operative connection between their associated belt sections, and a coupling structure formed along a second side of the engaging plate for releasably engaging a complementary coupling structure carried by the third belt section.

Still another object of the present invention is to provide a coupling comprising a first coupling plate having an upstanding locking pin, a second coupling plate having a slot for receiving the pin when the two coupling plates are engaged in overlapping relationship and a deformable element carried by the second coupling plate with portions overlapping the slot to yieldably resist the travel of the pin within the slot when opposing forces act on the two coupling plates.

Still further objects and advantages of the present invention will readily occur to one skilled in the art to which the invention pertains upon reference to the following detailed description.

DESCRIPTION OF THE DRAWINGS

The description refers to the accompanying drawing in which like reference characters refer to like parts throughout the several views and in which.

DESCRIPTION OF THE PREFERRED EMBODIMENT

Figures 1, 2, 3, 4:
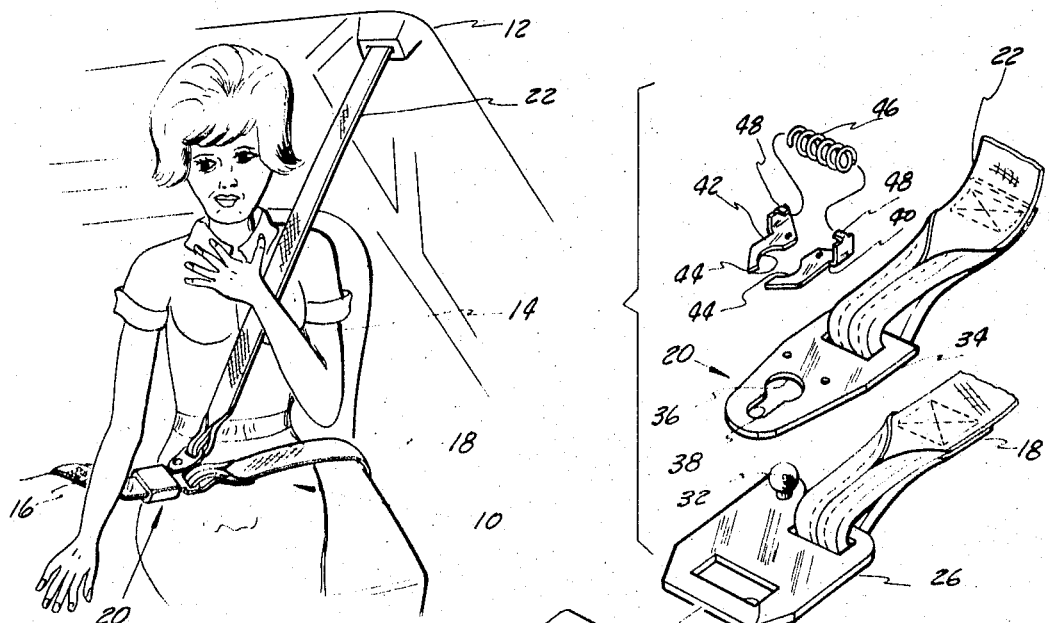
FIGURE 1 is a perspective view of a vehicle body restraining system illustrating the preferred embodiment of the present invention.
FIGURE 2 is an exploded view of the preferred coupling assembly of FIGURE 1.
FIGURE 3 is a sectional view of the coupling assembly of FIGURE 1 showing the spring loaded retaining fingers engaged with the locking pin.
FIGURE 4 is an exploded view of another version of the preferred coupling employing the energy absorbing tear strip.

Referring to the drawings, FIGURE 1 illustrates a preferred safety seat belt system 10 mounted to a vehicle 12 and arranged to apply a restraining force to a body 14 seated in the vehicle 12. The seat belt system 10 comprises a pair of lap belt sections 16 and 18 mounted on opposite lateral sides of the body 14 with their lower ends anchored on opposite lateral sides of the body 14 and their upper ends joined by a preferred coupling assembly 20 to form a pelvic restraint. A shoulder belt section 22 preferably has its upper end anchored to a structural portion of the vehicle 12 behind the seated position of the body 14. Belt section 22 has its lower end adapted for an operative connection to the lap belt sections 16 and 18 by means of the preferred coupling assembly 20.

The coupling assembly 20 comprises a buckle mechanism 24 preferably having a conventional push button actuated tongue locking structure adapted to releasably engage an apertured tongue. Buckle mechanisms of this type are well known to those skilled in the art, so the particular details of the internal structure will not be described in detail.

The opposite belt section 18 carries an engaging plate 26 having a tongue 28 formed along one edge and provided with an aperture 30. The tongue 28 is contoured for reception by the buckle 24 so that the internal locking structure of the buckle 24 can engage the aperture 30 to provide a releasable connection between the belt sections 16 and 18 and to close the lap belt system. When the tongue 28 is engaged with the buckle 24, the belt sections 16 and 18 are in a condition to provide a pelvic restraint on the body 14.

An upstanding locking pin 32 having an enlarged head is fixedly mounted along a second side of the engaging plate 26.

A coupling plate 34 is carried at the end of the shoulder belt 22 and has a pin receiving aperture 36 with a diameter larger than the enlarged head of the pin 32 so that the coupling plate 34 can be engaged with the engagement plate 26 in an overlapping relationship. A slot 38 extends away from the aperture 36 in a direction opposite to the tensile pull normally applied on the belt 22.

The width of the slot 38 is less than the diameter of the enlarged head of the pin 32 but accommodates the narrowed portion of the pin 32 so that the pin can move longitudinally in the slot in a direction away from the aperture 36.

A pair of retainer elements 40 and 42 are each pivotally mounted to the coupling plate 34 adjacent the aperture 36. The retainer elements 40 and 42 each have a pair of cut out portions 44 arranged so that as the elements 40 and 42 are pivoted toward and away from one another the cut out portions 44 move toward and away from the neck of the pin 32. A spring 46 engages a pair of upright portions 48 of the elements 40 and 42 and biases the cut out portions 44 toward one another. The portions 48 provide means for applying a finger actuating release force so that the cut out portions 44 can be separated to permit the coupling plate 34 to be disengaged from the engaging plate in a direction perpendicular to the plane of the plate 26.

In operation, the preferred coupling assembly 20 permits the user to join the belt sections 16 and 18 to provide an operative pelvic restraint. By joining the coupling structure carried by the shoulder belt 22 to the pin 32, an operative connection is formed between the shoulder belt 22 and the lap belt sections. Normally, the coupling plate 34 is engaged with the engaging plate 26 with the pin 32 being received by the aperture 36 and retained therein by the cooperating retaining elements 40 and 42. When the shoulder belt 22 applies a restraining force on the body 14, a tensile force is developed on the shoulder belt 22 that moves the coupling plate 34 in a direction away from the engaging plate 26 so that the pin 32 is received by the slot 38 and is released by the retaining elements 40 and 42. As the pin travels the length of the slot 38 it moves into abutment with the end of the slot to provide a nonyielding tensile connection between the belt 22 and the lap belt sections 16 and 18. Thus in the absence of a condition developing a tensile force on the shoulder belt 22, the coupling plates 34 and 26 can be easily disconnected by merely applying a finger actuating release force to portions 48 of the retainer elements and lifting the coupling plate 34 away from the engaging plate 26.

Referring to FIGURE 4, another embodiment of the invention is illustrated and employs the relative movement between the engaging plate 26 and the coupling plate 34, upon the application of a restraining force, to provide means for absorbing the kinetic energy of the body 14 as it moves forwardly in the direction of the former travel of the vehicle 12 when an abnormal occurrence has produced an abrupt deceleration of the vehicle 12. A deformable, expendable flat element 50 is fixedly mounted to the coupling plate 34 and has a pin-receiving aperture 52 in registry with the aperture 36 of the coupling plate 34. The expendable element 50 overlaps the slot 38 and engages the neck of the pin 32 as the coupling plate 34 moves relative to the engaging plate 26. The element 50 is preferably formed of a light weight plastic, however, it could be formed of a suitable strip of aluminum or other material that will tear as the pin 32 moves in a direction away from the aperture 36 in the aperture 50. The expendable element 50 provides means for absorbing the kinetic energy of the body 14 as it is suddenly displaced forwardly from the normal seated position so that it experiences a gradual deceleration with the forward travel being terminated by the pin 32 coming into abutment with the end of the slot 38. An advantage of the element 50 over conventional energy absorbing means 50 is that by mounting it with threaded fasteners to the coupling plate 34, it can be readily and easily replaced without disassemblying a considerable amount of structure as is necessary with conventional energy absorbing devices.

It is to be understood that we have described our invention in its simplest terms and that various changes and revisions can be made in the preferred embodiments thereof without departing from the spirit of the invention.

Having described our invention we claim:

1. In a safety seat belt system for applying a body restraining force, the combination comprising:
  (a) a first lap belt section;
  (b) a buckle housing having releasable tongue locking structure carried by said first lap belt section;
  (c) a second lap belt section;
  (d) an engaging plate carried by said second lap belt section and having:
    (1) a tongue formed along the edge of said engaging plate, said tongue being engageable with the tongue locking structure of said buckle housing to provide an operative connection between said first lap belt section and said second lap belt section; and
    (2) a first coupling structure mounted on said engaging plate;
  (e) a shoulder belt section; and
  (f) a second coupling structure carried by said shoulder belt section, said second coupling structure being engageable with said first coupling structure to provide a connection between said shoulder belt section and said engaging plate.

2. The combination as defined in claim 1, wherein said second coupling structure is movable from a first engaged position to a second engaged position with respect to said first coupling structure when a body restraining force is applied by said shoulder belt section.

3. The combination as defined in claim 1, wherein said second coupling structure is movable from a first engaged position to a second engaged position with respect to said first coupling structure when a body restraining force is applied by said shoulder belt section, and including a deformable element acting between said first and second coupling structures to provide a yieldable, energy absorbing link between said first and said second coupling structures.

4. The combination as defined in claim 1, wherein said first coupling structure comprises an upstanding locking pin mounted on said engaging plate; and said second coupling structure comprises a coupling plate adapted for attachment to said shoulder belt section, said coupling plate having an aperture for receiving said locking pin so that said coupling plate and said engaging plate can be engaged in overlapping relationship, and releasable latch mean smounted on said coupling plate for snapping on said pin when said coupling plate is engaged with said engaging plate.

5. The combination as defined in claim 1, wherein said first coupling structure comprises an upstanding locking pin having a head portion and being mounted on said engaging plate; and said second coupling structure comprises a coupling plate adapted for attachment to said shoulder belt section, said coupling plate having an aperture for receiving said locking pin when said coupling plate and said engaging plate are engaged in overlapping relationship, and releasable latch means for snapping on said pin to retain said coupling plate and said engaging plate in engagement, said releasable latch means comprising a pair of pivotally mounted latch fingers carried by said coupling plate adjacent said aperture, said fingers being movable in a plane parallel to said coupling plate and having cooperating pin-engaging portions movable toward and away from said pin, and finger-engaging portions for applying a release force to separate said pin-engaging portions in order to disengage said latch fingers from said pin, and including a spring biasing said pin-engaging portions toward one another.

6. The combination as defined in claim 1, wherein said first coupling structure comprising an upstanding locking pin mounted on said engaging plate with an enlarged head spaced from said engaging plate; and said second coupling structure comprises a coupling plate adapted for attachment to said shoulder belt section, said coupling plate having an aperture for receiving said locking pin so that said coupling plate and said engaging plate can be engaged in overlapping relationship, and a slot extending from said aperture in a direction away from said shoulder belt, said slot having a width less than the diameter of the head of said pin so that said coupling plate is movable relative to said engaging plate as the shoulder belt applies a body restraining force with said pin being received from said aperture by said slot to form an engagement between the engaging plate and the coupling plate; and including releasable latch means for snapping on said pin to retain said coupling plate and said engaging plate in engagement at such times as the pin is disposed in the aperture.

7. The combination as defined in claim 1, wherein said first coupling structure comprises an upstanding locking pin mounted on said engaging plate with a head spaced from said engaging plate; and said second coupling structure comprises a coupling plate adapted for attachment to said shoulder belt section, said coupling plate having an aperture for receiving said locking pin so that said coupling plate and said engaging plate can be engaged in overlapping relationship, and a slot extending from said aperture, said slot having a width accommodating the diameter of said pin and smaller than the head such that the pin can be moved from the aperture into the slot to allow the coupling plate to be moved relative to the engaging plate with the pin forming a connection between the two plates when said shoulder belt applies a body restraining force; and releasable latch means mounted on said coupling plate, said latch means being engageable with the locking pin for retaining said coupling plate and said engaging plate in engagement at such times as the pin is disposed in the aperture; and a deformable element mounted on said coupling plate, said deformable element having an aperture receiving said pin when the pin is in the aperture, said deformable element being supported such that said pin tears said deformable element when said coupling plate and said engaging plate are displaced relative to one another in a direction parallel to the plane of said engaging plate under the influence of said body restraining force.

8. The combination as defined in claim 1, wherein said first coupling structure comprises an upstanding locking pin mounted on said engaging plate with an enlarged head spaced from said engaging plate; and said second coupling structure comprises a coupling plate adapted for attachment to said shoulder belt section, said coupling plate having an aperture for receiving said locking pin so that said coupling plate and said engaging plate can be engaged in overlapping relationship, and a slot having one end connected to the aperture, said slot having a width less than the diameter of said enlarged head so that said pin is movable from said aperture and into one end of said slot when said shoulder belt applies a body restraining force; releasable latch means engageable with the pin for retaining said coupling plate and said engaging plate in engagement; and a deformable element mounted on said coupling plate adjacent said slot, said deformable element having portions disposed in the path of motion of the pin with respect to the slot, said portion being supported such that said pin tears said deformable element when said pin is received by one end of said slot and is moved toward its other end under the influence of said body restraining force; and wherein the other end of said slot limits the movement of said pin with respect to the slot such that the pin is operable to provide a non-yielding connection between said coupling plate and said engaging plate.

9. A coupling for a safety seat belt system, comprising:
   (a) a first coupling;
   (b) a second coupling having an opening for receiving the first coupling along a first path of motion, with respect to the second coupling, to a first position in which the first coupling is movable along a second path of motion, with respect to the second coupling, toward a second position, the second coupling being so formed as to prevent separation of the first coupling with respect to the second coupling as the first coupling is moved along its second path of motion;
   (c) a latch mounted on the second coupling for motion between a locking position in which the latch is operable to prevent removal of the first coupling from its first position along its first path of motion, but is inoperable to prevent motion of the first coupling from its first position toward its second position along its second path of motion, and a release position in which the latch is inoperable to prevent removal of the first coupling from its first position along its first path of motion;
   (d) a bias member urging the latch toward its locking position;
   (e) a deformable member mounted on the second coupling in the second path of motion of the first coupling, said deformable member being formed such that it is deformed as the first coupling is moved from its first position toward its second position along its second path of motion; and
   (f) means connected to the latch to move the latch toward its release position to allow removal of the first coupling from its first position along its first path of motion.

10. A coupling as defined in claim 9, in which the first coupling comprises a pin; the second coupling comprises a plate having an elongated opening for receiving the pin to its first position in which opposite ends of the pin are on opposite sides of the plate, the opening being of a configuration which allows passage of the pin to its second position in a motion parallel to the plate, but prevents passage of the pin normal to the plate at such times as the pin is between its first and second positions, and the deformable member is mounted on one side of the plate such that its extends across the path of motion of the pin between its first and second positions.

11. A coupling as defined in claim 9, in which the means for moving the latch to its release position comprises a handle for applying a release effort, and wherein the latch is formed to be moved from its locking position to its release position by the first coupling as the first coupling is moved along its first path of motion toward its first position.

12. A coupling as defined in claim 10, in which the deformable member is supported on the second coupling to span a portion of the opening, and to be torn by the pin as the first coupling is moved from its first position toward its second position along its second path of motion.

13. In a vehicle having a seat belt system, the combination comprising:
   (a) a pair of lap belts;
   (b) a buckle mechanism carried on the end of one of the lap belts;
   (c) a tongue, engageable with the buckle mechanism, carried on the other of the lap belts so that the two lap belts may be connected together;
   (d) a locking pin having a neck with one end joined to the tongue, and a head supported on the other end of the neck;
   (e) a shoulder belt;
   (f) a plate carried on the shoulder belt such that the plate extends beyond the end of the shoulder belt, said plate having a thickness less than the height of the neck, an elongated opening with a first end suited to form a socket for the locking pin, and a second end suited for receiving the head of the locking pin, to a position in which opposite ends of the neck are on opposite sides of the plate, said elongated opening having a pair of spaced sides, extending between its first and second ends, of a configuration which prevents passage of the head between said pair of sides from a position on one side of the plate to a position on its other side, but allows passage of the pin between its first and second ends;
   (g) a latch mounted on the plate for motion between a locking position in which it is operable to prevent passage of the head of the pin through the second end of the opening, but is inoperable to prevent motion of the pin from the second end of the opening toward the first end, and a release position in which the latch is inoperable to prevent passage of the head of the pin through the second end of the opening; and
   (h) a bias member connected to the latch to bias it toward its locking position, whereby the tongue can be connected to the plate by inserting the head of the pin through the opening so that it is engaged by the latch in its locking position, and then moved with respect to the plate with the pin forming a connection between the tongue and the plate.

14. The combination as defined in claim 13, in which the second end of the opening is enlarged to allow passage of the head of the pin through the opening from a position on one side of the plate to a position on its other side, 15. In a vehicle seat belt system, the combination comprising:
   (a) a buckle habing tongue-locking structure;
   (b) a plate having a tongue along its edge formed such that it is releasably engageable with the tongue-locking structure to form a connection between the buckle and the plate;
   (c) first coupling structure carried on said plate; and
   (d) a member having second coupling structure, complementary with respect to the first coupling structure, and formed such that it can be releasably engaged with the first coupling structure to form a connection between the plate and the member.

16. The combination as defined in claim 15, in which one of the coupling structures has an opening for receiving the other coupling structure and a latch mounted adjacent said opening, said latch being movable between a locking position in which it is engagable with the other coupling structure to form a connection between the first and second coupling structures, and a release position in which it is inoperable to form a connection between the first and second coupling structures, and a bias member connected to the latch member to urge the latch member toward its locking position.

References Cited

UNITED STATES PATENTS

| | | | |
|---|---|---|---|
| 1,178,135 | 4/1916 | Cowell | 24—223 |
| 1,642,278 | 9/1927 | Vanderlipp | 24—223 |
| 2,847,748 | 8/1958 | Robinton | 24—211 |
| 3,074,760 | 1/1963 | Hodgekin | 297—386 |
| 3,132,898 | 5/1964 | Kittlson | 297—386 |
| 3,179,997 | 4/1965 | Jalinaud | 24—230.1 |
| 3,198,288 | 8/1965 | Presunka | 297—386 |
| 3,289,792 | 12/1966 | Moberg | 188—1 |
| 3,364,532 | 1/1968 | Hatfield | 24—230.1 |
| 3,369,842 | 2/1968 | Adams et al. | 297—389 |
| 3,378,301 | 4/1968 | Romanzi et al. | 24—75 |

FOREIGN PATENTS 1,375,094  9/1964  France.

JAMES T. McCALL, Primary Examiner

U.S. Cl. X.R.

24—211, 230, 223; 297—386